United States Patent [19]

Strickler

[11] Patent Number: 5,332,870
[45] Date of Patent: Jul. 26, 1994

[54] PRECISION BALANCE

[75] Inventor: Ernst Strickler, Wolfhausen, Switzerland

[73] Assignee: Mettler-Toledo AG, Greifensee, Switzerland

[21] Appl. No.: 972,602

[22] Filed: Nov. 6, 1992

[30] Foreign Application Priority Data

Jun. 5, 1992 [CH] Switzerland ............ 1815/92-5

[51] Int. Cl.⁵ .................................. G01G 21/22
[52] U.S. Cl. .................................. 177/262
[58] Field of Search .................. 177/262, 263

[56] References Cited

U.S. PATENT DOCUMENTS 143,499 10/1873 Chatillon .......................... 177/262
3,186,505 6/1965 Vinzelberg et al. ............... 177/262

FOREIGN PATENT DOCUMENTS 8524163 9/1986 United Kingdom .

Primary Examiner—George H. Miller, Jr.
Attorney, Agent, or Firm—Feiereisen & Kueffner

[57] ABSTRACT

A precision balance for weighing flat filters has a funnel-shaped weighing dish. The weighing dish has a wall composed of a netting or a thin sheet steel provided with perforations. The weighing dish is mounted in a housing having a lower part and an upper part which is hinged to the lower part and can be swung away from the lower part. A cover vertically displaceably mounted in the upper part can be lowered onto the rim of the weighing dish. The weighing dish is grounded for discharging static charges on the filter.

12 Claims, 2 Drawing Sheets

PRECISION BALANCE

BACKGROUND OF THE INVENTION

1. Field of the Invention

The present invention relates to a precision balance for weighing flat filters in a weighing dish, wherein the flat filters rest partially on the weighing dish during weighing.

2. Description of the Related Art

For the determination, for example, of the quantity of solid contaminants contained in gases, particularly in exhaust gases of internal combustion engines or in the exhaust air of industrial plants, flat filters are arranged in the exhaust gas or exhaust line and the solids retained by the filter are weighed. The filters are usually mounted along the rim thereof in a frame which serves as a support device. Consequently, no residues are deposited on the rim portion of the filter which is covered by the frame.

Germany utility model G 8524163.6 discloses a weighing dish for a top-loading balance which is used for weighing flat filters. This known weighing dish has an approximately rectangular plane center portion, wherein upwardly arched corrugations which extend parallel to the edges of the center portion are provided for supporting the flat filter placed on the weighing dish. In addition, in the known weighing dish, the two longer edges thereof form upwardly angled rim portions.

A flat filter placed on the known weighing dish touches with its rim the angled rim portions of the weighing dish. The central portion of the filter on which the residues are deposited comes into contact with the corrugations arranged on the bottom of the weighing dish.

Thus, in the known weighing dish, it is impossible to prevent filter residues from remaining on the corrugations after weighing. This is a disadvantage, particularly when flat filters with different residues must be weighed, or when the residues include radioactive substances. It is difficult to clean the weighing dish because, due to the extremely high resolution of such microbalances, the weighing dish must be constructed with very little mass.

SUMMARY OF THE INVENTION

Therefore, it is the object of the present invention to provide a weighing dish in which the flat filters to be weighed can only contact the weighing dish in rim portions on which no residues have been deposited.

Another object of the present invention is to construct the weighing dish in such a way that round as well as polygonal filters of different sizes can be weighed in one and the same weighing dish.

Yet another object of the present invention is to provide a weighing dish with a cover which can be easily placed on the weighing dish and taken off the weighing dish, wherein the cover facilitates screening and discharging of electrostatically charged residues.

In accordance with the present invention, in a precision balance of the above-described type, the weighing dish is funnel-shaped.

The funnel-shaped configuration of the weighing dish provides the surprising result that the filter to be weighed rests on the weighing dish exclusively with the rim portions thereof on which there are no contaminants and, consequently, a contamination of the weighing dish is prevented.

In accordance with a further development of the invention, the weighing dish is composed of a metal net or a very thin perforated sheet steel which provides the advantage that the filter can be easily grasped by means of tweezers and, in addition, the weighing dish has only a minimal mass.

Another feature of the invention provides that the weighing dish has a circular ring-shaped outer rim which serves to stiffen the weighing dish, on the one hand, and forms an optimum support for a cover, on the other hand.

Radially extending perforations in the weighing dish facilitate grasping of the filter by means of tweezers. The weighing dish is produced in an inexpensive manner by welding or gluing along the ends of the development of the metal net or thin sheet steel.

For meeting another of the objects recited above, the precision balance according to the present invention includes a cover, which is also made of a metal net or a very thin perforated sheet steel and has a low mass. The cover serves for the complete screening and discharging of electrostatic charges of filter residues.

In accordance with a preferred feature, the cover is vertically displaceably mounted in an upper part of a housing which surrounds the weighing dish as draft protection. A handle is mounted above the cover for lifting the cover from the funnel-shaped weighing dish before the cover is swung away.

The material of the weighing dish is very elastic because of the fine net-like construction. Consequently, it is not necessary to provide an overload protection.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DESCRIPTION OF THE PREFERRED EMBODIMENT

Figure 1:
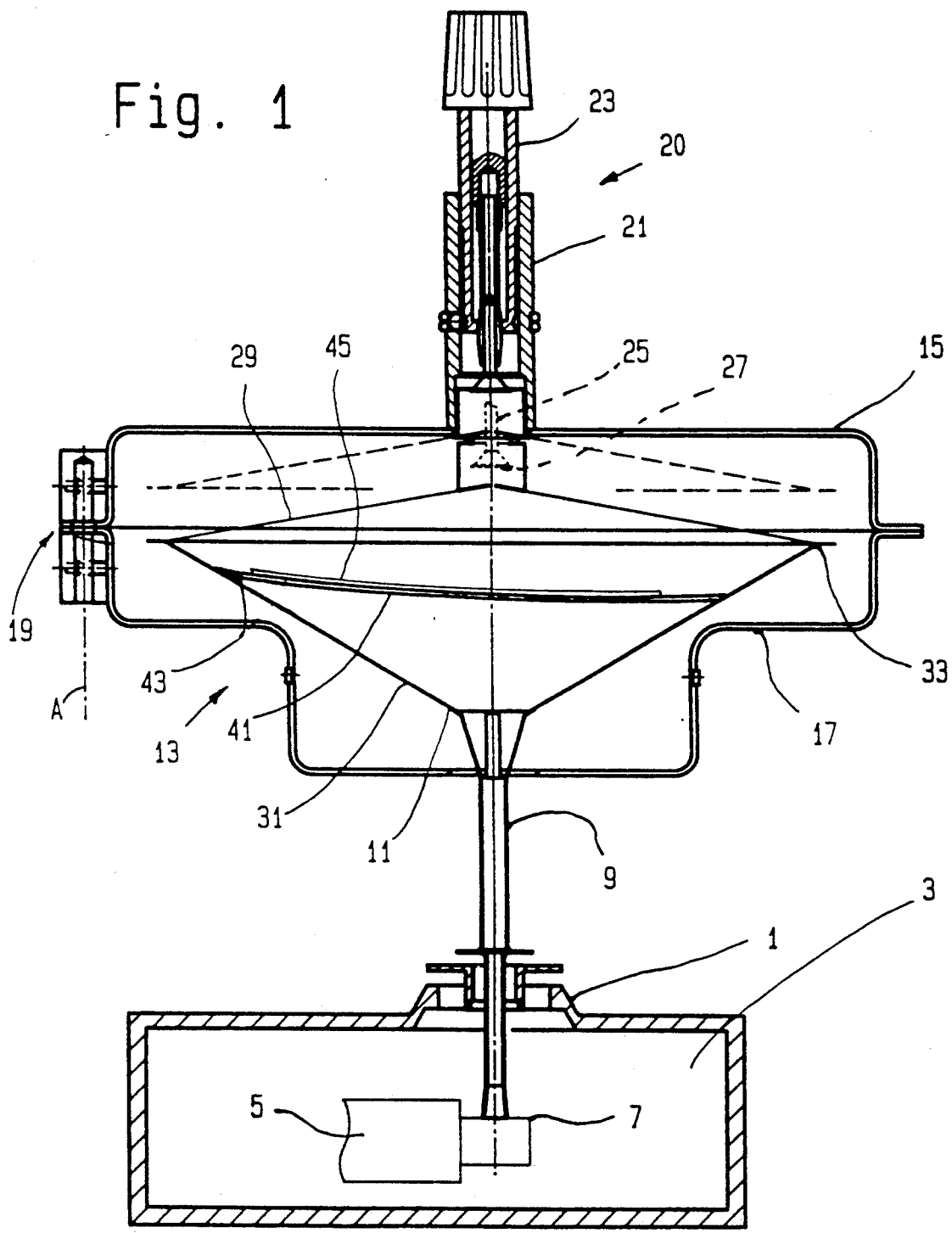
FIG. 1 is a cross-sectional view of a weighing dish mounted in a housing serving as draft protection.

FIG. 1 of the drawing schematically shows a housing 1 of a balance 3 and an only partially illustrated measuring cell 5 with load receiving means 7. A base 9 of a weighing dish 11 rests on the load receiving means 7. The weighing dish 11 is arranged within a cylindrical housing 13 which serves as draft protection and is composed of an upper part 15 and a lower part 17. The upper part 15 is connected to the lower part 17 by means of a hinge or joint 19. In the illustrated embodiment, the axis A of the hinge 19 extends vertically and, consequently, the upper part 15 can be swung to the side to make the weighing dish 11 accessible.

A guide device 20 with a cylindrical tube 21 and a handle 23 guided in the tube 21 are mounted on the upper part 15. A threaded bolt 25 with a head 27 is fastened to the handle 23. The threaded bolt 25 projects downwardly from the handle 23 and a weighing dish cover 29 is suspended from the head 27. The handle 23 is mounted in the tube 21 in such a way that, in the raised position thereof, it remains within the tube 21, so that the cover 29 is carried in a position in which it is raised from the weighing dish 11; this position of cover 29 is illustrated in broken lines of the cover. When the cover 29 is lowered and rests on the rim 33 of the weighing dish 11, further lowering of the handle 23 has the result that the handle 23 is uncoupled from the threaded bolt 25.

The cover 29 may be plane or funnel-shaped and may be manufactured in the same manner as the weighing dish 11.

The manner in which the weighing dish housing 13 rests on the housing 1 of the balance 3 is not illustrated in the drawing.

Figure 2:
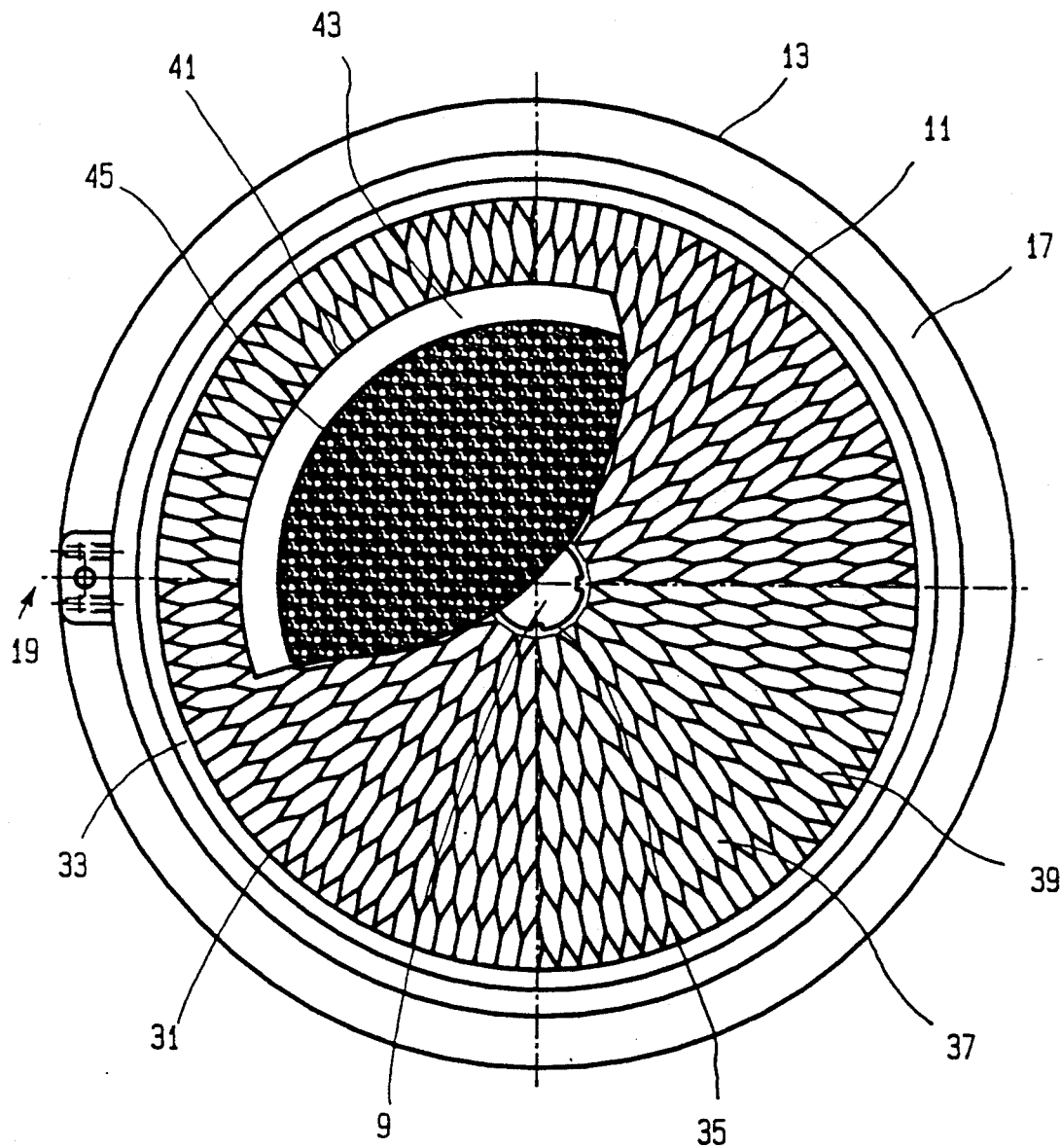
FIG. 2 is a top view of the funnel-shaped weighing dish and a broken-away portion of a filter placed on the weighing dish.

In the illustrated embodiment, the weighing dish 11 is composed of a conical wall 31 having a circular ring-shaped circumferential rim 33 and a support edge 35, as shown in FIG. 2.

The wall 31 is of a net-like material, wherein the net is composed of a wire cloth or is manufactured by working a plurality of perforations 37, for example, by etching, from a very thin sheet of preferably stainless steel. The webs 39 between the perforations 37 are constructed as fine as possible and the material used for manufacturing the weighing dish 11 has a small thickness of a few hundredths of a millimeter, so that the total weight of the weighing dish 11 is in the range of less than 1 gram. The perforations 37 preferably extend essentially radially and are, for example, polygonal in this principal direction.

As illustrated in FIG. 1, a round filter 41 is placed with its rim 43 on which there are no contaminants on the wall 31 of the weighing dish 11. The central portion of the round filter 41 on which most contaminants 45 are deposited does not come into contact with the wall 31, as can also be seen in FIG. 1. This result is obtained independently of whether the filter 41 is placed exactly concentrically in the weighing dish 11 or, as shown in FIG. 1, slightly eccentrically. In addition, a filter 41 which is not round or which is polygonal can usually rest on the wall 31 of the weighing dish only with its rim 43 which is free of contaminants.

It is possible to ground the weighing dish through the base 9, so that any electrostatic charges carried by the filter 41 can be discharged.

It should be understood that the preferred embodiments and examples described are for illustrative purposes only and are not to be construed as limiting the scope of the present invention which is properly delineated only in the appended claims.

I claim:

1. A precision balance for weighing a flat filter, the precision balance comprising a funnel-shaped weighing dish, whereby the flat filter rests partially on the weighing dish during weighing, wherein the weighing dish has a wall composed of one of metal netting and very thin perforated sheet steel.

2. The precision balance according to claim 1, wherein the funnel-shaped weighing dish has a circumferential circular ring-shaped rim.

3. The precision balance according to claim 2, comprising a cover configured to be placeable on the rim of the weighing dish.

4. The precision balance according to claim 3, wherein the cover is flat.

5. The precision balance according to claim 3, wherein the cover is funnel-shaped.

6. The precision balance according to claim 3, wherein the cover is of metal netting.

7. The precision balance according to claim 3, wherein the cover is of a very thin perforated sheet steel.

8. The precision balance according to claim 3, comprising a housing as draft protection, the weighing dish being mounted in the housing, the housing having a lower part and an upper part hinged to the lower part.

9. The precision balance according to claim 8, wherein the cover is mounted in the upper part of the housing so as to be vertically displaceable, further comprising means for raising the cover into a raised position and for lowering the cover into a lower position in which the weighing dish rests on the weighing dish and is uncoupled from the upper part of the housing.

10. The precision balance according to claim 1, wherein the wall of the weighing dish is composed of a length of one of the metal netting and the very thin perforated sheet steel having ends, the ends being welded or glued together.

11. The precision balance according to claim 1, wherein the balance further comprises a measuring cell with a load receiving means, and means for grounding the weighing dish through the load receiving means for discharging electrostatic charges of the flat filter.

12. A precision balance for weighing a flat filter, the precision balance comprising a funnel-shaped weighing dish, whereby the flat filter rests partially on the weighing dish during weighing, the weighing dish having a wall of very thin perforated sheet steel, wherein the sheet steel of the wall has radially extending perforations.

* * * * *